United States Patent [19]

Takechi

[11] Patent Number: 4,763,221
[45] Date of Patent: Aug. 9, 1988

[54] SUPERCONDUCTING MAGNET APPARATUS WITH EMERGENCY RUN DOWN UNIT

[75] Inventor: Moriaki Takechi, Ako, Japan

[73] Assignee: Mitsubishi Denki Kabushiki Kaisha, Japan

[21] Appl. No.: 92,588

[22] Filed: Sep. 3, 1987

[30] Foreign Application Priority Data

Sep. 9, 1986 [JP] Japan ................................ 61-210843

[51] Int. Cl.$^4$ ............................................. H02H 7/00
[52] U.S. Cl. ..................................... 361/141; 361/19; 335/216
[58] Field of Search ................... 361/19, 141; 335/216; 307/245, 306; 324/320, 322; 200/289; 323/360

[56] References Cited

U.S. PATENT DOCUMENTS 3,513,421  5/1970  Schindler et al. .................... 200/289
4,535,291  8/1985  Lee et al. ............................. 335/216

FOREIGN PATENT DOCUMENTS 49-47319  12/1974  Japan ..................................... 361/19

Primary Examiner—L. T. Hix
Assistant Examiner—David M. Gray
Attorney, Agent, or Firm—Leydig, Voit & Mayer

[57] ABSTRACT

A superconducting magnet apparatus comprises an emergency run down unit having a heater power source and a heater circuit switch, a superconducting coil, and a persistent current switch circuit, the persistent current switch connected in parallel to the superconducting coil and including a first persistent current switch connected in parallel to a first protective element of low resistance and a second persistent current switch connected in parallel to a second protective element of high resistance. The second persistent current switch has a persistent switch-heater connected to the heater power source through the heater circuit switch. Thus, when it becomes necessary to demagnetize the superconducting magnet apparatus being operated in a persistent current mode, the second persistent current switch parallel to the second protective element of high resistance is opened, whereby current flowing through the superconducting magnet decays rapidly.

3 Claims, 4 Drawing Sheets

SUPERCONDUCTING MAGNET APPARATUS WITH EMERGENCY RUN DOWN UNIT

BACKGROUND OF THE INVENTION

This invention relates to a superconducting magnet apparatus with an emergency run down unit. More particularly, it relates to a superconducting magnet apparatus with an emergency run down unit which is adapted to operate in a persistent current mode for the purpose of generating a static field in a magnetic resonance imaging system.

FIG. 1 is a schematic arrangement diagram exemplifying a prior-art superconducting magnet apparatus with an emergency run down unit of the type specified above. Referring to FIG. 1, numeral 1 designates a superconducting coil, in parallel with which a persistent current switch 2 is connected. The persistent current switch 2 is composed of a persistent current switch-superconductor 3, and a persistent current switch-heater 4 which is disposed in proximity thereto. Numeral 5 indicates a protective element, which is an appropriate resistor or diode and which is connected in parallel with the superconducting coil 1. This protective element 5 is provided in order to suppress a voltage which develops across the persistent current switch 2 when quenching has occurred in the superconducting coil 1. Such an arrangement is housed in a cold vessel 10. The interior of the cold vessel 10 is maintained at a required low temperature by a suitable refrigerant (not shown). In addition, numeral 11 indicates a heater power source which is connected to the persistent current switch-heater 4 through a heater circuit switch 12. A magnetizing current (or permanent current) $I_C$ flows circulating through a closed circuit which consists of the superconducting coil 1 and the persistent current switch-superconductor 3. Assuming now that the heater circuit switch 12 be in its open state, the persistent current switch 2 is cooled by the refrigerant to fall into a superconducting state.

Before the description of the operation of such a prior-art superconducting magnet apparatus with an emergency run down unit, the magnetization and demagnetization of the superconducting magnet apparatus in the case where the apparatus of this type is run in a persistent current mode will now be explained.

Shown in FIG. 2 is such a prior-art superconducting magnet apparatus with an emergency run down unit wherein a magnetizing portion is additionally provided. Referring to FIG. 2, numeral 16 indicates a magnetizing power source, which is connected in parallel with the superconducting coil 1 through current leads 17. In FIG. 2, parts assigned the same numerals as in FIG. 1 are identical or equivalent parts and shall be omitted from the description.

Now, the case where such a superconducting magnet apparatus is to be magnetized will be considered. First, the heater circuit switch 12 is closed to energize the persistent current switch-heater 4 and to heat the persistent current switch-superconductor 3. Then, this persistent current switch-superconductor 3 causes transition from the superconducting state to the normal state thereof and gives rise to a predetermined resistance.

FIG. 3 is a diagram exemplifying an equivalent circuit of the superconducting magnet apparatus which lies in the above state. In FIG. 3, symbol $r_P$ denotes the resistance of the persistent current switch-superconductor 3 in the normal state, symbol $r_D$ the impedance of the protective element 5, and symbol L the self-inductance of the superconducting coil 1. Also, symbol $I_S$ denotes an output current from the magnetizing power source 16, symbol $I_C$ a magnetizing current for the superconducting coil 1, and symbol $I_P$ a branch current for the persistent current switch 2.

The terminal voltage of the superconducting coil 1, namely, the voltage $V_P$ across the persistent current switch 2 is given by the following formula when, under such a state, the output current $I_S$ from the magnetizing power source 16 is increased with a fixed rise rate $\alpha$:

$$V_P = \alpha L (1 - e^{-r/L \cdot t})$$

where r denotes the parallel resultant resistance of the resistances $r_P$ and $r_D$. On this occasion, the current $I_P$ which is branched to the persistent current switch 2 is given by:

$$I_P = V_P / r_P$$

In general, however, the conduction bearing capacity of the persistent current switch 2 in the normal state is smaller than in the superconducting state. Therefore, the current rise rate $\alpha$ needs to be properly controlled lest the voltage $V_P$ across the persistent-current switch 2 during the magnetization should become excessive.

Assuming now that the magnetizing current $I_C$ for the superconducting coil 1 has reached a predetermined operating current, the heater circuit switch 12 is opened to cut off current flowing through the persistent current switch-heater 4. Then, the persistent current switch-superconductor 3 is cooled by the refrigerant and undergoes transition into the superconducting state. Under such a state, a superconducting closed circuit consisting of the superconducting coil 1 and the persistent current switch 2 is constructed, and the magnetizing current $I_C$ flows circulating this superconducting closed circuit.

Here, the output current $I_S$ from the magnetizing power source 16 is decreased, and the current leads 17 are detached thereby to separate the magnetizing power source 16 from the superconducting coil 1. Then, the same arrangement as shown in FIG. 1 is established, and the persistent current mode is carried out with the magnetizing current $I_C$ circulating through the superconducting coil 1 as the persistent current. In this state, the superconducting coil 1 is separate from the magnetizing power source 15 and is not affected by supply voltage, temperature changes, etc., so that the superconducting magnet apparatus can generate a very stable magnetic field. The apparatus therefore performs the operation based on the persistent current mode to the end of, for example, generating a static field in a magnetic resonance imaging system of which a very high stability is required.

Next, demagnetization of the superconducting magnet apparatus being operated in the persistent current mode is usually executed by tracing a process reverse to that of the foregoing magnetization.

That is, the superconducting magnet apparatus being operated with the arrangement shown in FIG. 1 has the magnetizing power source 16 connected to the superconducting coil 1 through the current leads 17, so as to establish the arrangement shown in FIG. 2. Subsequently, the output current $I_S$ from the magnetizing power source 16 is increased so as to equalize to the magnetizing current $I_C$ flowing through the superconducting coil 1. Thereafter, the heater circuit switch 12 is closed. Then, the persistent current switch-heater 4 is energized, and the persistent current switch-superconductor 3 is heated to cause transition into the normal state, so that the state as shown in FIG. 3 is established. In this state shown in FIG. 3, the predetermined resistance develops in the persistent current switch-superconductor 3, and hence, the output current $I_S$ from the magnetizing power source 16 is substantially equal to the magnetizing current $I_C$ for the superconducting coil 1. Thus, the superconducting coil 1 can be demagnetized in such a way that the output current $I_S$ from the magnetizing power source 16 is gradually lowered down to zero.

The demagnetization for the superconducting magnet apparatus being operated in the persistent current mode is usually executed by the method described above. Therefore, even when urgent demagnetization is required because of, for example, the adsorption of an iron piece or the outbreak of a fire, various steps are needed such as preparing the magnetizing power source 16, connecting the current leads 17, increasing the output current $I_S$ from the magnetizing power source 16 and opening the persistent current switch 2. Accordingly, the demagnetization in the case of employing such a magnetizing power source takes a long time.

For this reason, a method of urgent demagnetization to be described below has heretofore been applied to a superconducting magnet apparatus which is operated in the persistent mode:

By adopting the arrangement as shown in FIG. 1, the superconducting magnet apparatus is operated in the persistent current mode, while the persistent current switch-heater 4 is held connected to the heater power source 11 through the heater circuit switch 12 which is normally open. When urgent demagnetization becomes necessary, the heater circuit switch 12 is closed. Thus, the persistent current switch-heater 4 is energized, and the persistent current switch-superconductor 3 is heated to cause transition into the normal state, thereby to exhibit the resistance of a predetermined value.

FIG. 4 is an equivalent circuit diagram of the superconducting magnet apparatus which is in the operating state as described above. Since the persistent current switch-superconductor 3 develops the resistance owing to the transition from the superconducting state into the normal state, the magnetizing current $I_C$ having circulated through the superconducting coil 1 decays due to the consumption of energy on account of the normal resistance $r_P$ of the persistent current switch 2 and the parallel impedance $r_D$ of the protective element 5, and the superconducting coil 1 can be demagnetized. When a current decay speed on this occasion is studied, it is dominated by the following time constant which is stipulated by the self-inductance L of the superconducting coil 1, as well as the parallel resultant resistance r between the normal resistance $r_P$ of the persistent current switch 2 and the parallel impedance $r_D$ of the protective element 5:

$$\tau = L/r$$

In consequence, the value of the parallel resultant resistance r needs to be selected large in order to demagnetize the superconducting magnet apparatus in a short time. Since, however, the voltage across the persistent current switch 2 is given by:

$$V_P = rI_C$$

the value of the parallel resultant resistance r selected large renders the terminal voltage of the persistent current switch 2 high, and the current $I_P$ to flow through this persistent current switch 2 increases.

The prior-art superconducting magnet apparatus with the emergency run down unit is constructed as described above and must select the parallel resultant resistance r at a large value in order to realize demagnetization in a short time, so that the voltage to be applied to the persistent current switch 2 increases. It has therefore been necessary to use a persistent current switch of high allowable terminal voltage.

The persistent current switch 2 is used also for the usual magnetization and demagnetization utilizing the magnetizing power source 16, and during the magnetization and demagnetization, the persistent current switch-heater 4 is energized and warmed, with the result that the refrigerant in the cold vessel 10 is vaporized and consumed. Since the amount of consumption of the refrigerant attributed to the energization of the persistent current switch-heater 4 is proportional to heater power on this occasion, the heater power of such a persistent current switch should desirably be low.

Nevertheless, in order to heighten the allowable terminal voltage of the persistent current switch, the persistent current switch-superconductor needs to be enlarged, and hence, the electric power of the persistent current switch-heater for warming the superconductor must be increased. These have led to the problems that the persistent current switch to be used becomes large and expensive, and that the amount of consumption of the refrigerant during the usual magnetization or demagnetization utilizing the magnetizing power source increases.

On the other hand, in order to reduce the applied voltage to the persistent current switch and lower the allowable terminal voltage, thereby making it possible to employ a persistent current switch of low heater power, the parallel resultant resistance r must be selected low. This has led to the problem that the apparatus cannot be demagnetized in a short time in an emergency.

SUMMARY OF THE INVENTION

This invention has the objective of eliminating the problems as mentioned above, and has for its main object to provide a superconducting magnet apparatus with an emergency run down unit in which the superconducting magnet apparatus being operated in the persistent current mode can be demagnetized in a short time in an emergency, and further, heater power during usual magnetization or demagnetization utilizing a magnetizing power source can be lowered to lessen the amount of consumption of a refrigerant.

The superconducting magnet apparatus according to this invention comprises a superconducting coil and a persistent current switch circuit connected in parallel to the superconducting coil, and including a first persistent current switch connected in parallel to a first protective element of low resistance, and a second persistent current switch connected in parallel to a second protective element of high resistance, said second persistent current switch having a persistent current switch-heater connected to a heater power source through a heater circuit switch.

DESCRIPTION OF THE PREFERRED EMBODIMENT

Figure 5:
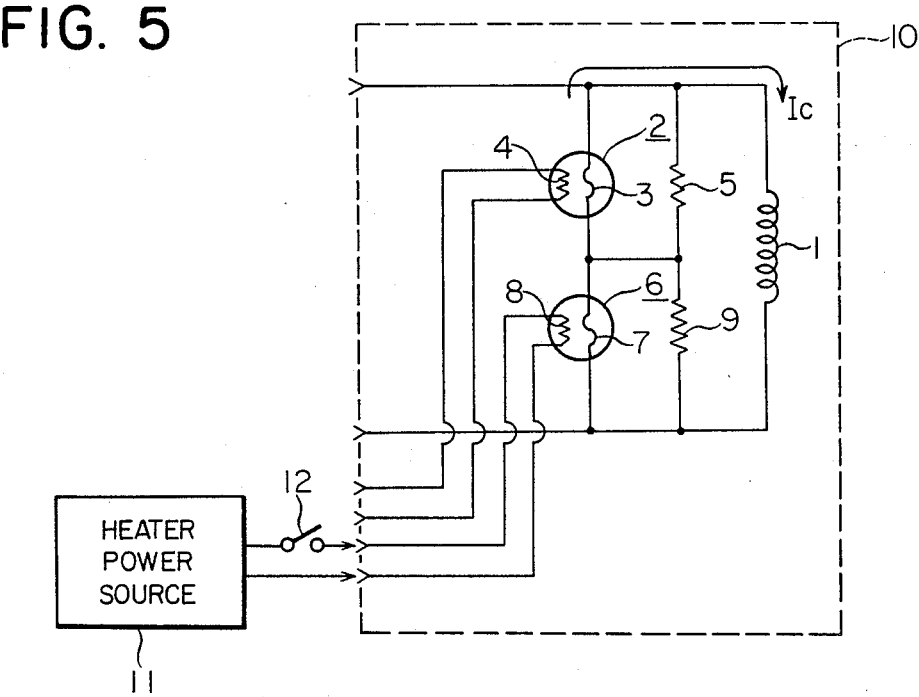
FIG. 5 is a schematic arrangement diagram of a superconducting magnet apparatus with an emergency run down unit according to an embodiment of this invention.

FIG. 5 is a schematic arrangement diagram of a superconducting magnet apparatus with an emergency run down unit in one embodiment according to this invention. Referring to FIG. 5, a superconducting coil 1 is connected in parallel to a series circuit which includes a first persistent current switch 2 and a second persistent current switch 6. Here, the first persistent current switch 2 has a first persistent switch-superconductor 3 and a corresponding first persistent current switch-heater 4, while the second persistent current switch 6 has a second persistent current switch-superconductor 7 and a corresponding second persistent current switch-heater 8. In addition, a first protective element of low resistance 5 is in parallel to the first persistent current switch 2, while a second protective element of high resistance 9 is in parallel to the second persistent current switch 6. Such an arrangement is housed in a cold vessel 10. A heater power source 11 is connected through a heater circuit switch 12 to the second persistent current switch-heater 8 of the second persistent current switch 6.

In the apparatus of the embodiment constructed as described above, it is assumed that the occurrence of any emergency during the operation of the apparatus in a persistent current mode would necessitate demagnetization. Then, the heater circuit switch 12 is closed, whereby the second persistent current switch-heater 8 is energized and warmed, and the second persistent current switch 6 is responsively brought into its open state.

Figure 6:
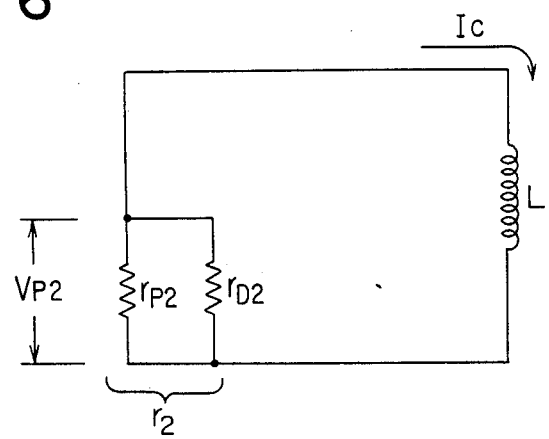
FIG. 6 is an equivalent circuit diagram of the apparatus of the embodiment during the operation thereof.

An equivalent circuit diagram of the apparatus of the embodiment under this state is exemplified in FIG. 6. In FIG. 6, symbol $r_{P2}$ denotes the resistance of the second persistent current switch-superconductor 7 in the normal state thereof, symbol $r_{D2}$ the resistance of the second protective element 9, symbol $r_2$ the resultant value of the aforementioned parallel resistances $r_{P2}$ and $r_{D2}$, and symbol L the self-inductance of the superconducting coil 1. Thus, a persistent current $I_C$ having been circulating through a superconducting closed circuit composed of the superconducting coil 1, first persistent current switch 2 and second persistent current switch 6 during the persistent current mode operation is dissipated to decay till the demagnetization by the parallel resultant resistance $r_2$ which has been developed by opening the second persistent current switch 6. On this occasion, a voltage indicated by the following formula is applied to the second persistent current switch 6:

$$V_{P2} = r_2 I_C$$

The resistance $r_{D2}$ of the second protective element 9 is selected high so that the apparatus may be demagnetized in a short time by heightening the parallel resultant resistance $r_2$. Therefore, the applied voltage to the second persistent current switch 6 is rendered high. For this reason, the second persistent current switch 6 must be one that exhibits a high allowable terminal voltage, and required heater power therefor increases accordingly. However, when urgent demagnetization is to be executed, such increase in the heater power poses no problem.

On the other hand, when normal magnetization or demagnetization is to be executed with a magnetizing power source, it is required that heater power be low and that the amount of consumption of a refrigerant be small.

Figure 7:
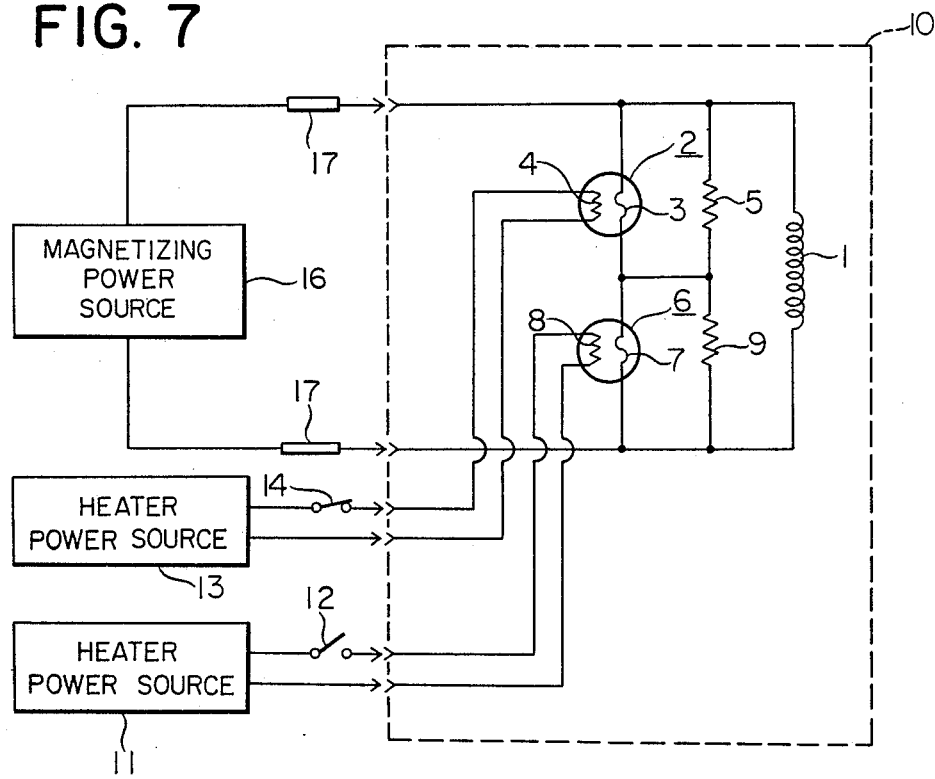
FIG. 7 is a schematic arrangement diagram of the apparatus of the embodiment which is additionally provided with a magnetizing power source.

FIG. 7 is a schematic arrangement diagram in the case where, as to be embodiment, the magnetization and demagnetization are carried out with the magnetizing power source. Referring to FIG. 7, another heater power source 13 is connected through another heater circuit switch 14 to the first persistent current switch-heater 4 of the first persistent current switch 2. Also, a magnetizing power source 16 is connected to the superconducting coil 1 through current leads 17. Thus, in normal magnetization utilizing the magnetizing power source 16, the heater circuit switch 12 is held open, and the other heater circuit switch 14 is closed. Then, the first persistent current switch 2 becomes open, and the second persistent current switch 6 is held closed.

Figure 1:
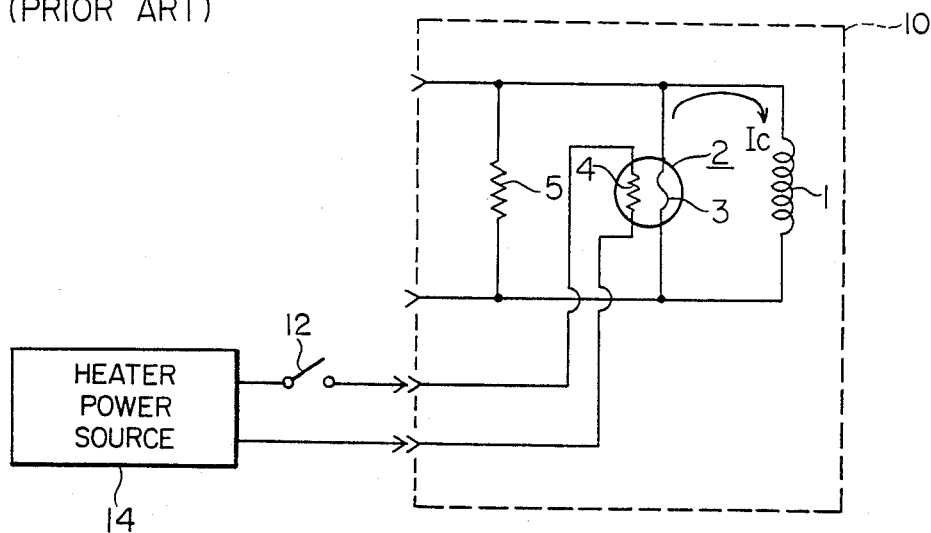
FIG. 1 is a schematic arrangement diagram of a prior-art superconducting magnet apparatus with an emergency run down unit.
Figure 2:
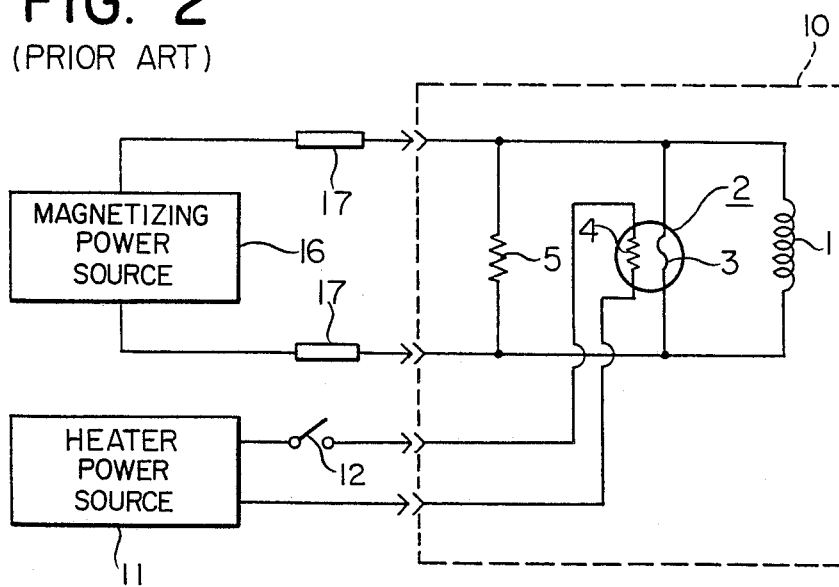
FIG. 2 is a schematic arrangement diagram of the apparatus of the prior-art example which is additionally provided with a magnetizing power source.
Figure 3:
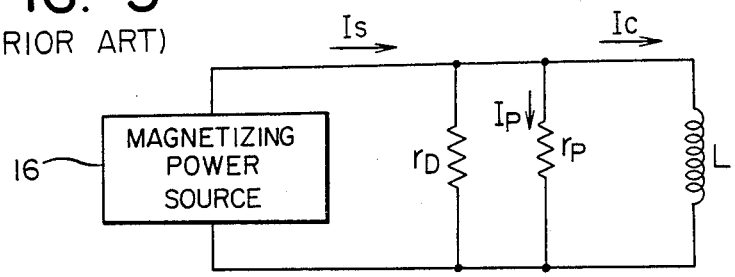
FIG. 3 is an equivalent circuit diagram of the prior-art example during the operation thereof.
Figure 4:
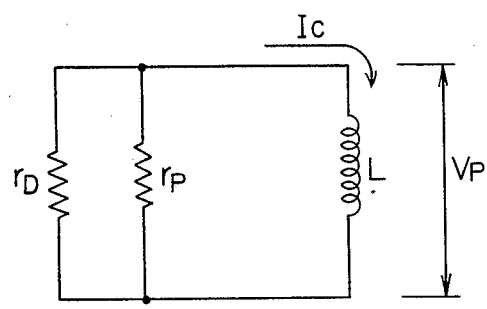
FIG. 4 is an equivalent circuit diagram of the prior-art example during the urgent demagnetizing operation thereof.
Figure 8:
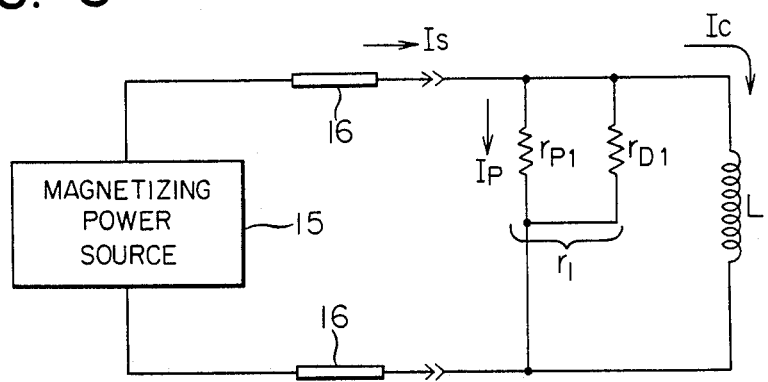
FIG. 8 is an equivalent circuit diagram of the apparatus of FIG. 7 during the operation thereof.

An equivalent circuit diagram of the apparatus of the embodiment under such a state is exemplified in FIG. 8. This is similar to the equivalent circuit of the prior-art example employing the magnetizing circuit as shown in FIG. 3, and the magnetization and demagnetization can be executed by the same methods as in the prior art. The terminal voltage of the first persistent current switch 2 in such a case can be suppressed to a desired low voltage by appropriately limiting the extent of the increase or decrease of the output current $I_S$ of the magnetizing power source 16. Therefore, as the first persistent current switch 2, one of low allowable terminal voltage and low heater power can be used, so that the amount of consumption of the refrigerant during the magnetization or demagnetization can be lessened. Further, in a case where the persistent current switch of low allowable terminal voltage is employed, as a corresponding protective element one of low resistance must be selected. However, when urgent demagnetization is performed, the parallel resultant resistance $r_2$ based on the second protective element of high resistance 9 and the second persistent current switch 6 is predominant as illustrated in FIG. 6. Therefore, even when an element of low resistance is selected as the protective element 5, there is no fear that the period of time for the demagnetization in an emergency will become extended.

Figure 9:
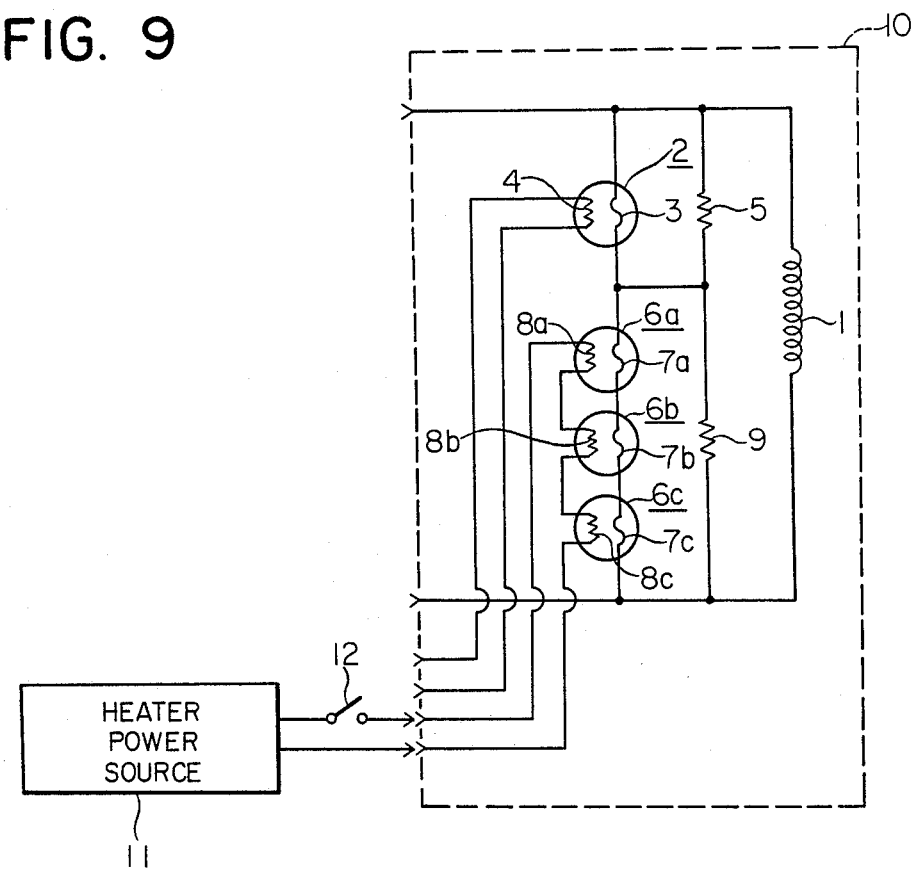
FIG. 9 is a schematic arrangement diagram of the apparatus of the embodiment which is partly modified.

FIG. 9 shows an apparatus in which the foregoing embodiment is partly modified. Referring to FIG. 9, symbols 6a-6c denote second persistent current switches, respectively, which are respectively composed of second persistent current switch-superconductors 7a-7c and second persistent current switch-heaters 8a-8c. In addition, the second persistent current switches 6a-6c are connected in series with one another, and the second protective element of high resistance 9 is connected in parallel with them.

The allowable terminal voltage of the plurality of persistent current switches connected in series with one another as illustrated in FIG. 9 is increased in correspondence with the number of the series-connected switches when compared with that of the single persistent current switch. It is therefore possible to readily realize and allowable terminal voltage which is required for connecting the second protective element of high resistance 9 in parallel.

In order to urgently demagnetize the superconducting coil 1 being operated in the persistent current mode, the heater circuit switch 12 is closed to energize the second persistent current switch-heaters 8a-8c, whereby the second persistent current switches 6a-6c are opened. Thus, an arrangement similar to the equivalent circuit of FIG. 6 explained before is established, and the demagnetization can be executed in a short time.

As described above, a superconducting magnet apparatus with an emergency run down unit according to this invention comprises superconducting coil and a persistent current switch circuit connected in parallel to the superconducting coil, and including a first persistent current switch having a first protective element of low resistance, and a second persistent current switch connected in parallel to a second protective element of high resistance, said second persistent current switch having a persistent current switch-heater connected to a heater power source through a heater circuit switch. Therefore, the invention can achieve the effect that, in case of urgent demagnetization, the second persistent current switch corresponding to the second protective element of high resistance is opened, whereby the superconducting coil is rapidly demagnetized, and the effect that, for magnetization or demagnetization under the operation of the apparatus which is additionally provided with a magnetizing power source, the first persistent current switch corresponding to the first protective element of low resistance is used, so the amount of consumption of a refrigerant is reduced.

What is claimed is:

1. A superconducting magnet apparatus comprising an emergency run down unit having a heater power source and a heater circuit switch, a superconducting coil, and a persistent current switch circuit, said persistent current switch circuit being connected in parallel to said superconducting coil and including a first persistent current switch connected in parallel to a first protective element of low resistance and a second persistent current switch connected in parallel to a second protective element of high resistance, said second persistent current switch having a persistent current switch-heater connected to said heater power source through said heater circuit switch.

2. A superconducting magnet apparatus as defined in claim 1 wherein said second persistent current switch includes a plurality of persistent current switching members connected in series, said switching members connected in series having said second protective element of high resistance connected in parallel therewith.

3. A superconducting magnet apparatus as defined in claim 2 wherein each of said persistent current switching members has a persistent current switch-heater.

* * * * *